United States Patent [19]
Herd et al.

[11] Patent Number: 5,672,921
[45] Date of Patent: Sep. 30, 1997

[54] SUPERCONDUCTING FIELD WINDING ASSEMBLAGE FOR AN ELECTRICAL MACHINE

[75] Inventors: Kenneth Gordon Herd, Niskayuna; Evangelos Trifon Laskaris, Schenectady, both of N.Y.

[73] Assignee: General Electric Company, Schenectady, N.Y.

[21] Appl. No.: 402,438

[22] Filed: Mar. 13, 1995

[51] Int. Cl.$^6$ .............................. H02K 3/18; H02K 1/32; H02K 55/04
[52] U.S. Cl. .................. 310/52; 310/54; 310/269
[58] Field of Search ........................... 310/52, 54, 201, 310/208, 261, 269; 335/216, 300, 301

[56] References Cited

U.S. PATENT DOCUMENTS

| | | | |
|---|---|---|---|
| 3,261,995 | 7/1966 | Kohn | 310/64 |
| 3,343,111 | 9/1967 | Kafka | 335/216 |
| 3,610,977 | 10/1971 | Dalmo et al. | 310/65 |
| 3,639,672 | 2/1972 | Kafka | 335/216 |
| 3,891,875 | 6/1975 | Laskaris | 310/40 |
| 3,991,333 | 11/1976 | Laskaris | 310/52 |
| 4,048,529 | 9/1977 | Pomeroy et al. | 310/54 |
| 4,058,746 | 11/1977 | Mole et al. | 310/10 |
| 4,082,967 | 4/1978 | Laskaris | 310/64 |
| 4,291,997 | 9/1981 | Laskaris | 310/52 |
| 4,333,228 | 6/1982 | Koch | 335/216 |
| 4,365,176 | 12/1982 | Nathenson et al. | 310/54 |
| 4,640,005 | 2/1987 | Mine et al. | 335/216 |
| 4,739,200 | 4/1988 | Oberly et al. | 310/10 |
| 4,924,198 | 5/1990 | Laskaris | 335/216 |
| 5,381,122 | 1/1995 | Laskaris et al. | 335/216 |
| 5,404,122 | 4/1995 | Maeda et al. | 335/216 |
| 5,479,145 | 12/1995 | Kalsi | 310/14 |
| 5,538,942 | 7/1996 | Koyama et al. | 335/216 |
| 5,539,366 | 7/1996 | Dorri et al. | 335/216 |

FOREIGN PATENT DOCUMENTS 690550  3/1996  European Pat. Off. .

OTHER PUBLICATIONS

I.P.C. Proceedings of the 4th Intern. Cryogenic Eng. Conference., May 1972, London, pp. 243–246, Z.J.J. Stekly and G.Y. Robinson, "Cryogenic Aspects of Rotating Superconducting field coils for Superconducting Machines".

IEEE Transactions on Magnetics, vol. Mag-15, No. 1, Jan. 1979, pp. 711–714, H.L. Southall and C.E. Oberly, "System Considerations for Airborne, High Power Superconducting Generators".

IEEE Transactions on Magnetics, vol. Mag-15, No. 1, Jan. 1979, pp. 703–710, S.H. Minnich et al., "Design Studies of Superconducting Generators".

"Development of a Helium Transfer Coupling for Superconducting Generators" by Guangfu et at., Cryogenics, vol. 30, Sep. 30, 1990, pp. 735–738.

"Superconducting Synchronous Condenser Design and It's Performance Test Results" by S. Nakamura at al., IEE Transactions of Magnetics, vol. Mag 21, No. 2, Mar. 1985, New York, pp. 783–790.

European Search Report (with Annex), Appl. No. EP 96 30 3076.

*Primary Examiner*—Clayton E. Laballe
*Attorney, Agent, or Firm*—Douglas E. Erickson; Marvin Snyder

[57] ABSTRACT

A superconducting field winding assemblage for an electrical machine, such as a rotary generator or a linear motor. The field winding assemblage includes at least two pole assemblies. Each pole assembly has a direction of motion, a solid core, a superconductive coil assembly generally surrounding the solid core, and a first cooling conduit. The superconductive coil assembly has a generally longitudinally extending axis positioned generally perpendicular to the direction of motion and has an epoxy-impregnated, generally racetrack-shaped superconductive coil having a minor axis positioned generally parallel to the direction of motion. The first cooling tube contains a gaseous cryogen (such as gaseous helium) and is positioned to be in thermal contact with the superconductive coil.

7 Claims, 1 Drawing Sheet

SUPERCONDUCTING FIELD WINDING ASSEMBLAGE FOR AN ELECTRICAL MACHINE

BACKGROUND OF THE INVENTION

The present invention relates generally to superconductivity, and more particularly to a superconducting field winding assemblage for an electrical machine.

Electrical machines having field windings include, but are not limited to, rotary generators, rotary motors, and linear motors. Rotors for rotary generators and rotary motors include multi-pole rotors whose many poles are radially spaced apart from and circumferentially surround the rotor shaft. Non-superconducting rotors include solid-core rotors, such as iron-core rotors. Iron-core rotors saturate at an air-gap magnetic field strength of about 2 Tesla. Known superconductive rotors employ air-core designs to achieve air-gap magnetic fields of 3 Tesla or higher. Air-core superconductive rotors require larger amounts of superconductive wire, which adds to the number of coils required, the complexity of the coil supports, and the cost. Such superconductive rotors may have porous or epoxy-impregnated superconductive coils cooled by liquid helium, with the used helium being returned as room-temperature gaseous helium. Using liquid helium for cryogenic cooling requires continuous reliquefaction of the returned, room-temperature gaseous helium, and such reliquefaction poses significant reliability problems and requires significant additional energy. What is needed is a superconducting field winding assemblage for an electrical machine that does not have the disadvantages of the air-core and liquid-cooled superconducting field winding assemblages of, for example, known superconductive rotors.

SUMMARY OF THE INVENTION

It is an object of the invention to provide a superconductive field winding assemblage for an electrical machine such as, for example, a rotary generator, a rotary motor, or a linear motor.

The field winding assemblage of the invention is for an electrical machine and includes at least two pole assemblies. Each pole assembly has a direction of motion, a solid core, a superconductive coil assembly generally surrounding the solid core, and a first cooling conduit. The superconductive coil assembly has a generally longitudinally extending axis positioned generally perpendicular to the direction of motion and has an epoxy-impregnated, generally racetrack-shaped superconductive coil having a minor axis positioned generally parallel to the direction of motion. The first cooling conduit contains a gaseous cryogen and is positioned to be in thermal contact with the superconductive coil.

In a first preferred embodiment, the field winding assemblage is a rotor field winding assemblage, the direction of motion is a circumferential direction of motion about an axis of rotation, and the pole assemblies form a circumferential array of pole assemblies positioned about the axis of rotation.

In a second preferred embodiment, the field winding assemblage is a linear motor field winding assemblage, the direction of motion is a generally linear direction of motion, and the pole assemblies form a linear array of pole assemblies positioned generally parallel to the linear direction of motion.

Several benefits and advantages are derived from the invention. The solid core allows, for example, a 2-Tesla (or less) superconductive rotor to use about 10 times less superconductive wire than would be used for an air-core superconductive rotor design. The drastic reduction in the amount of superconductive wire needed by the rotor reduces the number of coils needed. The epoxy-impregnated superconductive coil is self standing allowing solid conduction cooling by a small first cooling tube instead of requiring a large container to hold a liquid cryogen into which the superconductive coil must be immersed.

BRIEF DESCRIPTION OF THE DRAWINGS

The accompanying drawings illustrate several preferred embodiments of the present invention wherein.

DETAILED DESCRIPTION OF THE INVENTION

Figure 1:
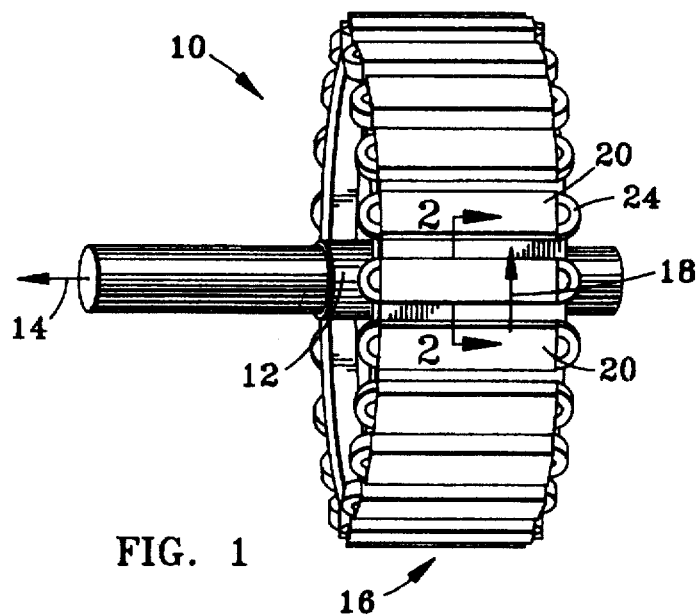
FIG. 1 is a perspective schematic view of a first preferred embodiment of the superconducting field winding assemblage of the invention showing a rotor field winding assemblage.
Figure 2:
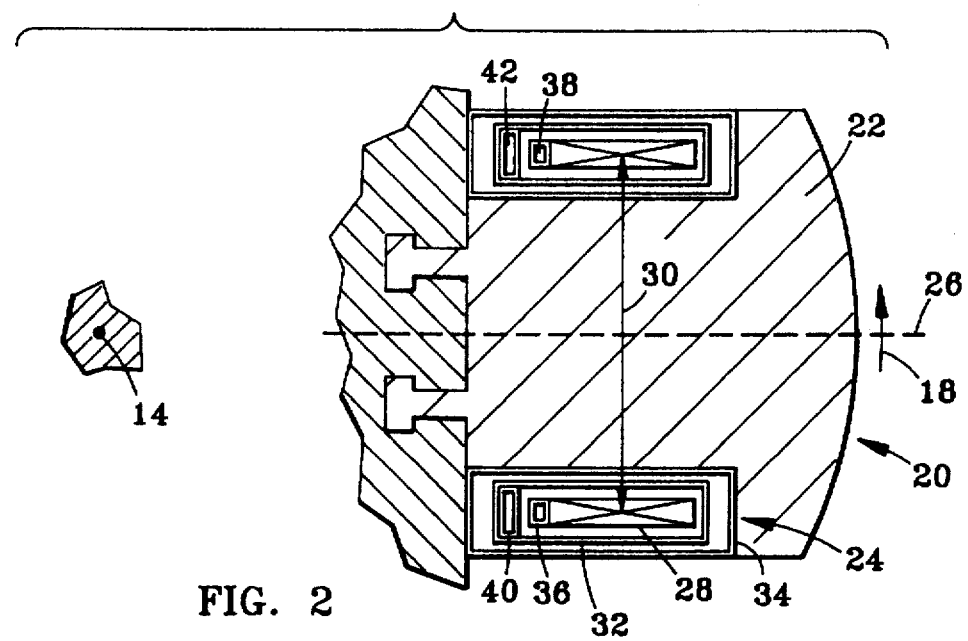
FIG. 2 is a schematic sectional view, taken along lines 2—2 in FIG. 1, of a pole assembly together with its attachment to a portion of the rotor rim.

Referring now to the drawings, wherein like numerals represent like elements throughout, FIGS. 1-2 show a first preferred embodiment of the field winding assemblage of the present invention wherein the field winding assemblage is for an electrical machine, wherein the electrical machine is a rotary generator 10 (only the superconducting rotor 12 portion of which is shown in the figures, the superconducting rotor 12 having an axis of rotation 14), and wherein the field winding assemblage is a rotor field winding assemblage 16. The field winding assemblage includes a direction of motion which for the rotor field winding assemblage 16 is a circumferential direction of motion 18 about an axis of rotation which is the axis of rotation 14 of the superconducting rotor 12.

The rotor field winding assemblage 16 includes a plurality of pole assemblies 20 each including a solid core 22 and a superconductive coil assembly 24 generally surrounding the solid core 22. Preferably, the solid core 22 consists essentially of iron. Each superconductive coil assembly 24 has a generally longitudinally extending axis 26 disposed generally perpendicular to the circumferential direction of motion 18. Each superconductive coil assembly 24 also has an epoxy-impregnated, generally racetrack-shaped superconductive coil 28 having a minor axis 30 disposed generally parallel to the circumferential direction of motion 18. It is noted that "racetrack-shaped" includes straight sections connected by rounded corners. Preferably, the superconductive coil assembly 24 also includes a thermal shield 32 generally surrounding and spaced apart from the superconductive coil assembly 28, and the superconductive coil assembly 24 further includes a vacuum enclosure 34 surrounding and spaced apart from the thermal shield 32. In an exemplary embodiment, the superconductive coil 28 is a niobium-tin superconductive coil. It is noted from FIG. 1 that the plurality of pole assemblies 20 is a circumferential array of pole assemblies disposed about the axis of rotation 14.

In an exemplary embodiment not shown in the figures, the superconductive coils 28 are superconductively connected in series, with such coil connections between circumferentially-adjacent coil assemblies 24 being generally surrounded by appropriate thermal shield connections and being further surrounded by vacuum enclosure connections.

Each pole assembly 20 additionally includes a direction of motion which, for the rotor field winding assemblage 16, is a circumferential direction of motion about an axis of rotation which is identical to the circumferential direction of motion 18 of the rotor field winding assemblage 16 about the axis of rotation 14 of the superconducting rotor 12.

Each pole assembly 20 also includes a first cooling conduit 36 containing a gaseous cryogen 38 and disposed in thermal contact with the superconductive coil 28. Preferably, the gaseous cryogen 38 consists essentially of gaseous helium at a temperature of between generally ten and generally seventy Kelvin. Preferably, each pole assembly 20 further includes a second cooling conduit 40 containing a gaseous cryogen 42 and disposed in thermal contact with the thermal shield 32. It is noted from FIG. 2 that the first cooling conduit 36 is spaced apart from the thermal shield 32 and that the second cooling conduit 40 is spaced apart from the superconductive coil 28.

Figure 3:
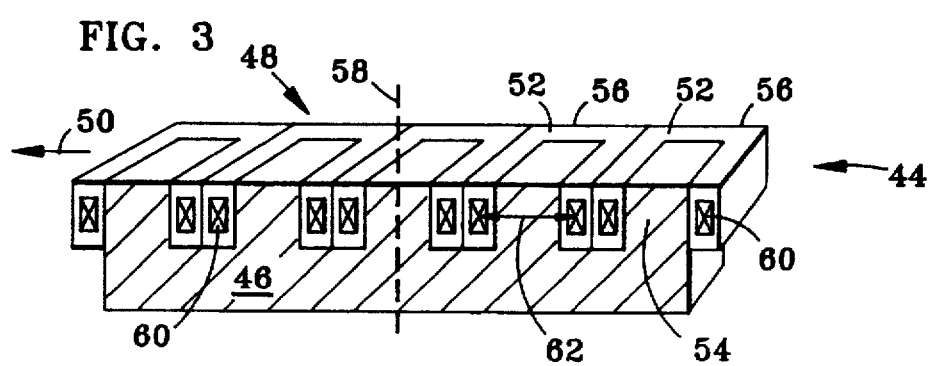
FIG. 3 is a perspective cut-away schematic view of a second preferred embodiment of the superconducting field winding assemblage of the invention showing a linear motor field winding assemblage.

Referring again to the drawings, FIG. 3 shows a second preferred embodiment of the field winding assemblage of the present invention wherein the field winding assemblage is for an electrical machine, wherein the electrical machine is a linear motor 44 (only the cut-away moving portion 46 of which is shown in the figures), and wherein the field winding assemblage is a linear motor field winding assemblage 48. The field winding assemblage includes a direction of motion which for the linear motor field winding assemblage 48 is a generally linear direction of motion 50.

The linear motor field winding assemblage 48 includes a plurality of pole assemblies 52 each including a solid core 54 and a superconductive coil assembly 56 generally surrounding the solid core 54. Preferably, the solid core 54 consists essentially of iron. Each superconductive coil assembly 56 has a generally longitudinally extending axis 58 disposed generally perpendicular to the linear direction of motion 50. Each superconductive coil assembly 56 also has an epoxy-impregnated, generally racetrack-shaped superconductive coil 60 having a minor axis 62 disposed generally parallel to the linear direction of motion 50. Preferably, the superconductive coil assembly 56 also includes a thermal shield generally surrounding and spaced apart from the superconductive coil 60, and the superconductive coil assembly 56 further includes a vacuum enclosure surrounding and spaced apart from the thermal shield, such thermal shield and vacuum enclosure being omitted from FIG. 3 for clarity. In an exemplary embodiment, the superconductive coil 60 is a niobium-tin superconductive coil. It is noted from FIG. 3 that the plurality of pole assemblies 52 is a linear array of pole assemblies disposed generally parallel to the linear direction of motion 50.

In an exemplary embodiment not shown in the figures, the superconductive coils 60 are superconductively connected in series, with such coil connections between linearly-adjacent coil assemblies 56 being generally surrounded by appropriate thermal shield connections and being further surrounded by vacuum enclosure connections.

Each pole assembly 52 additionally includes a direction of motion which, for the linear motor field winding assemblage 48, is a generally linear direction of motion which is identical to the linear direction of motion 50 of the linear motor field winding assemblage 48.

Each pole assembly 52 also includes a first cooling duct (omitted from FIG. 3 for clarity) containing a gaseous cryogen and disposed in thermal contact with the superconductive coil 60. Preferably, the gaseous cryogen consists essentially of gaseous helium at a temperature of between generally ten and generally seventy Kelvin. Preferably, each pole assembly 52 further includes a second cooling duct (also omitted from FIG. 3 for clarity) containing a gaseous cryogen and disposed in thermal contact with the thermal shield (omitted from FIG. 3 for clarity). It is noted that the first cooling duct is spaced apart from the thermal shield and that the second cooling duct is spaced apart from the superconductive coil 60.

It is pointed out that the field winding assemblage 16 and 48 of the present invention is not limited to a rotor field winding assemblage 16 (such as for a rotary generator 10 or a rotary motor) or to a linear motor field winding assemblage 48 but includes any field winding assemblage. It is noted that conventional rotary generators, rotary motors, and linear motors may be retrofitted to have their non-superconductive field winding assemblages replaced with the field winding assemblage 16 and 48 of the present invention.

It is noted that, for example, the superconductive coil 28 may be supported in the vacuum enclosure 34 during operation of the electrical machine by first and second thermally insulative honeycomb assemblages (omitted from FIG. 2 for clarity). By "thermally insulative" is meant that the honeycomb assemblage has a coefficient of thermal conductivity generally not exceeding that of filamentary glass reinforced epoxy at a temperature of generally fifty Kelvin. Preferably, the first thermally insulative honeycomb assemblage is disposed between the superconductive coil 28 and the thermal shield 32, and the second thermally insulative honeycomb assemblage (or a thermally insulative suspension strap) is disposed between the thermal shield 32 and the vacuum enclosure 34. Preferably, each of the honeycomb assemblages includes a plurality of generally identical cells having a common open direction aligned to extend from the superconductive coil 28 to the vacuum enclosure 34. In an exemplary enablement, each thermally insulative honeycomb assemblage is a filamentary-reinforced-epoxy (FRE) composite honeycomb structure whose distance between opposing sides of a cell ranges between generally one millimeter and generally one centimeter. The honeycomb assemblage provides a compression support structure having adequate lateral shear support and a low heat leak. It is noted that conventional support structures for superconducting coils employ discrete tension support members and discrete lateral support members. The honeycomb assemblages may or may not have a compressive preset depending on a particular application. Each honeycomb assemblage may be a monolithic (i.e., integral) assemblage or may consist of a multiplicity of discrete and spaced-apart or contacting sub-assemblages.

An engineering analysis of a rotor field winding assemblage 16 for a rotary electric generator 10 designed in accordance with the principles of the present invention would result in using 200 pounds of superconductive wiring compared with having to use 10,000 pounds of non-superconductive copper wiring in a non-superconductive rotor design or having to use 2000 pounds of superconductive wiring in an air-core, liquid-helium cooled superconductive rotor design. It is noted that the advantage of any superconductive rotor is the elimination of resistive losses and, because of cryogenic cooling, the elimination of thermal cycling problems typical of non-superconducting copper windings. Air-core superconductive rotors require large amounts of superconductive wire which adds to the number of coils required, the complexity of the coil supports, and the cost when compared with the superconductive rotor field winding assemblage 16 of the present invention. Liquid-helium cooled superconductive rotors require continuous reliquefaction of the returned, room-temperature gaseous helium, with such reliquefaction posing significant reliability problems and requiring significant additional energy. Such cooling problems are not present in the rotor field winding assemblage 16 of the present invention.

The foregoing description of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A field winding assemblage for an electrical machine, said field winding assemblage comprising a plurality of pole assemblies each including:

a) a direction of motion;
   b) a solid core;
   c) a superconductive coil assembly generally surrounding said solid core and having a generally longitudinally extending axis disposed generally perpendicular to said direction of motion, an epoxy-impregnated, generally racetrack-shaped superconductive coil having a minor axis disposed generally parallel to said direction of motion, a thermal shield generally surrounding and spaced apart from said superconductive coil, and a vacuum enclosure surrounding and spaced apart from said thermal shield;
   d) a single-loop, generally racetrack-shaped, first cooling conduit generally coaxially aligned with said longitudinally extending axis, generally concentric with said superconductive coil, containing a gaseous cryogen, and disposed in thermal contact with said superconductive coil; and
   e) a single-loop, generally racetrack-shaped, second cooling conduit generally coaxially aligned with said longitudinally extending axis, generally concentric with said superconductive coil, containing a gaseous cryogen, and disposed in thermal contact with said thermal shield.

2. The field winding assemblage of claim 1, wherein said solid core consists essentially of iron.

3. The field winding assemblage of claim 2, wherein said gaseous cryogen consists essentially of gaseous helium at a temperature of between generally ten and generally seventy Kelvin.

4. The field winding assemblage of claim 1, wherein said field winding assemblage is a rotor field winding assemblage and wherein said direction of motion is a circumferential direction of motion about an axis of rotation.

5. The field winding assemblage of claim 4, wherein said plurality of pole assemblies is a circumferential array of pole assemblies disposed about said axis of rotation.

6. The field winding assemblage of claim 1, wherein said field winding assemblage is a linear motor field winding assemblage and wherein said direction of motion is a generally linear direction of motion.

7. The field winding assemblage of claim 6, wherein said plurality of pole assemblies is a linear array of pole assemblies disposed generally parallel to said linear direction of motion.

* * * * *